Oct. 17, 1967 P. H. COVERT ETAL 3,347,734
APPARATUS FOR MAKING MICROFICHE
Filed March 13, 1964 2 Sheets-Sheet 1
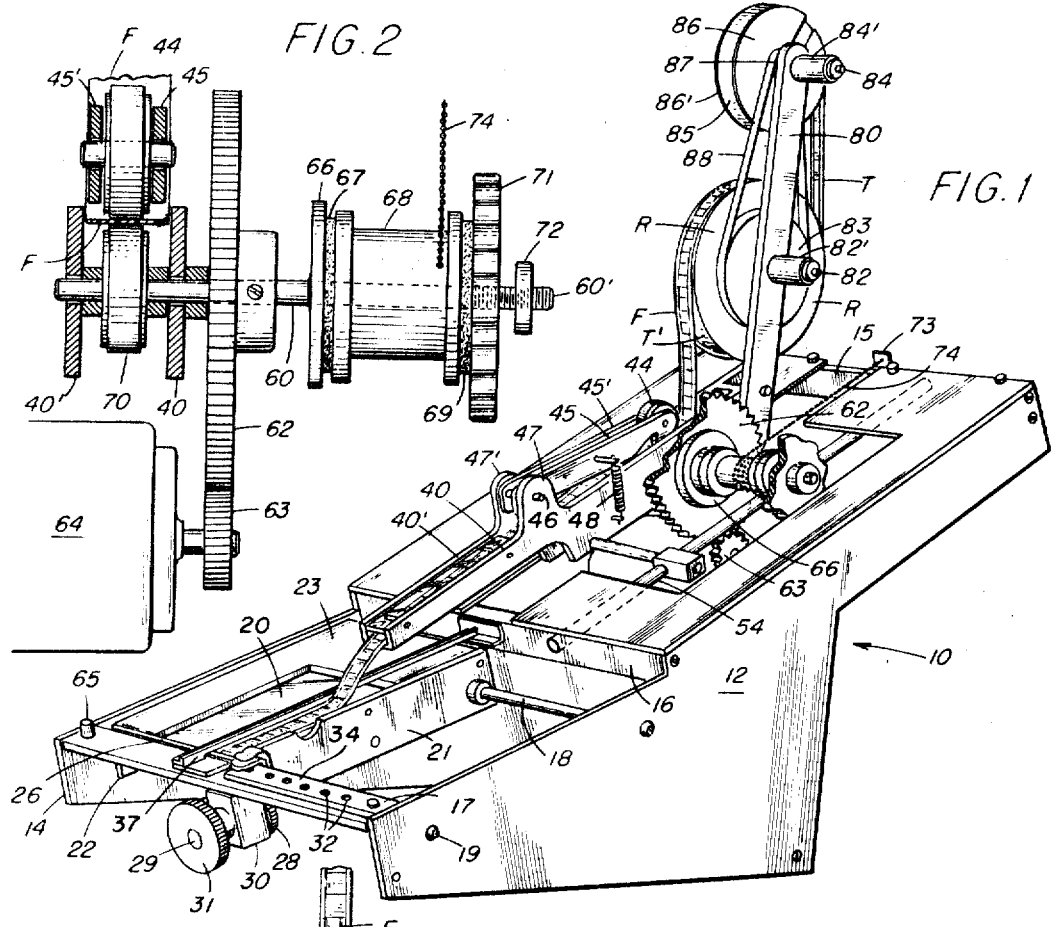
Inventors
Peter H. Covert
Jack J. Gilbert
By their attorneys
Howson and Howson Oct. 17, 1967   P. H. COVERT ETAL   3,347,734
APPARATUS FOR MAKING MICROFICHE
Filed March 13, 1964   2 Sheets-Sheet 2

Inventors
Peter H. Covert
Jack J. Gilbert
By their attorneys
Howson and Howson

United States Patent Office 3,347,734
Patented Oct. 17, 1967

3,347,734
APPARATUS FOR MAKING MICROFICHE
Peter H. Covert, Pomona, and Jack J. Gilbert, Suffern, N.Y., assignors to Atlantic Microfilm Corporation, Spring Valley, N.Y., a corporation of New York
Filed Mar. 13, 1964, Ser. No. 351,714
14 Claims. (Cl. 156—562)

This invention relates to the prepartion of microfiche by the adherence of strips of microfilm to a transparent plate or sheet.

In our copending application filed Mar. 2, 1964, Serial No. 348,427, we have disclosed and claimed Microfiche and Methods and Apparatus for Making the Same wherein film is prepared for adherence to a transparent card, plate or sheet, commonly 3″ x 5″, but also of various other sizes. According to our process, there is adhered to opposite edges of the same surface of the film two narrow parallel ribbons of a synthetic plastic ribbons of tape. The tape have a coating on both sides of pressure-sensitive adhesive. Those surfaces of the tape ribbons that are not adhered to the film are each covered by a protective coating of uncoated synthetic plastic tape.

The present invention relates to and has for an object the provision of apparatus for facilitating the application and adherence of the prepared film to the plate or sheet in a series of strips side by side across the sheet.

Another object is to make provision in such apparatus for the shifting of the sheet between applications of successive strips.

Another object is to make provision in such apparatus for paying out regular lengths or less than regular lengths of film so that when the end of a filmed subject is reached, less than a full length of film may be payed out, if desired.

Another object is to provide, in such a machine, for applying lengths of film to different sizes of plates or sheets.

Another object is to provide for motor-operated movement of certain operations of the machine.

Another object is to make provision in such apparatus for automatic removal of the covering strip from the adhesive tapes as the film is payed off its reel.

Other objects and advantages will become apparent as the invention is described in connection with the accompanying drawings.

In the drawings:

FIG. 1 is a perspective view of apparatus embodying the invention.

FIG. 2 is a detail elevation view of the mechanism for moving the film carrier and film.

FIG. 3 is a plan view, partly broken away, of the lower portion of the mechanism illustrated in FIG. 1.

Figure 4:
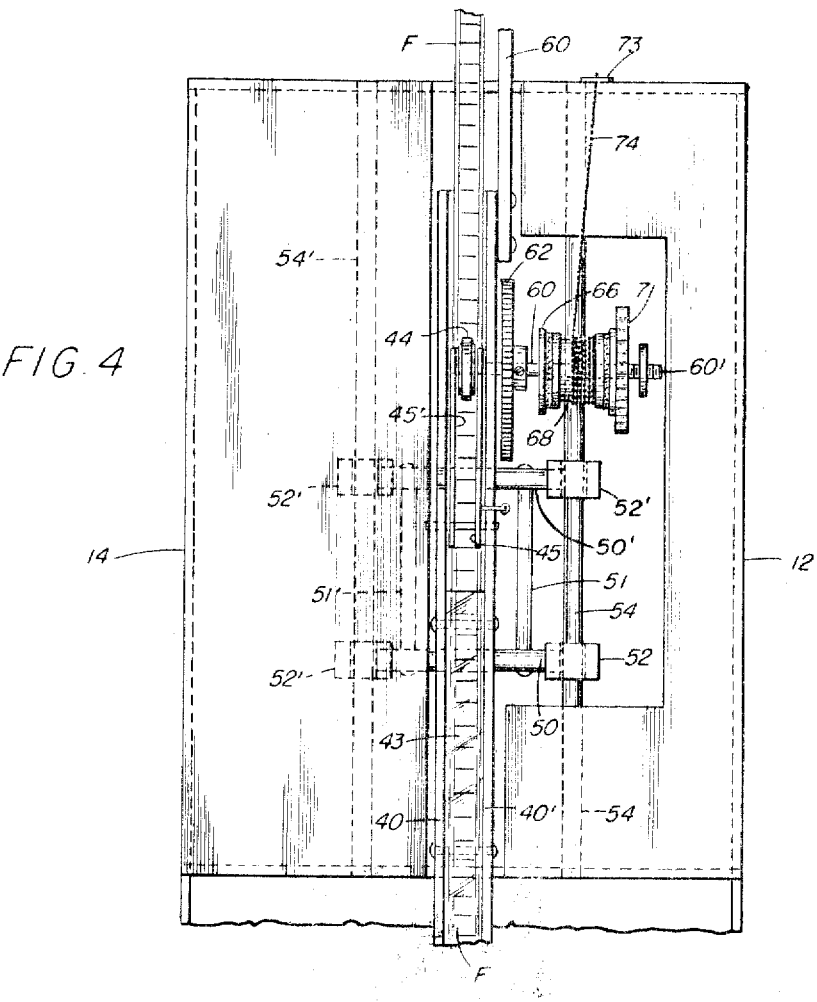
FIG. 4 is a plan view of the upper portion of the mechanism of FIG. 2 with the film-reel supporting structure broken away.

Referring to the drawings, the movable parts are supported on a frame 10 formed of a pair of similar substantially triangular side plates 12, 14 connected and spaced at their upper-rear, middle and lower-front edges by transverse bars 15, 16 and 17, respectively. Between the middle and lower front bars 16 and 17, transverse guide rods 18 and 19 also connect the side plates and serve additionally to guide lateral sliding movement of a plate transport, as hereinafter more fully described.

The transparent plate or sheet on which the film strips are to be mounted customarily is cut from a larger thin flexible cellulose acetate sheet, but any transparent sheet, plate or card may be used.

To support and transport the film-mount plate, a movable transparent platen 20 of clear synthetic plastic material, such as Lucite, is supported by and between two parallel bars 21, 22 which are slidably mounted on the previously mentioned guide rods 18 and 19. The platen is secured by screws or otherwise to the parallel bars 21, 22 so that all move as a unit to transport the film-mount plate thereon to its several locations, in position for the microfilm strips to be applied to it.

To locate the film-mount plates, of the various sizes which may be required, in proper positions on the platen 20, one or another flat opaque masking plates 23 of any suitable material may be attached removably to the platen by screws or otherwise. The mask may be of L-shape leaving a clear rectangular corner of the platen on which to lay the film-mount plate. The mask may be of different sizes to accommodate different size microfilm plates; or the mask may be removed when the full area of the platen is equal or substantially equal to the film-mount plate.

Since the microfilm strips are to be applied to the film-mount plate in a series of side by side positions, it is desirable to have the transport readily movable into said series of positions and to be accurately and automatically located in such positions.

For moving the platen transport, a rack 25 on an end plate 26 secured to the lower or outer ends of the bars 21, 22 and platen 20, is engaged by a rotatable pinion 28 on a stub shaft 29 mounted in a bearing block 30 which, in turn, is secured to the lower frame bar 17 at its middle. On the outer end of the stub shaft 29 is mounted a knurled thumb disc 31 for rotating the stub shaft and pinion 28 to cause the transport to move laterally of the machine frame.

Figure 5:
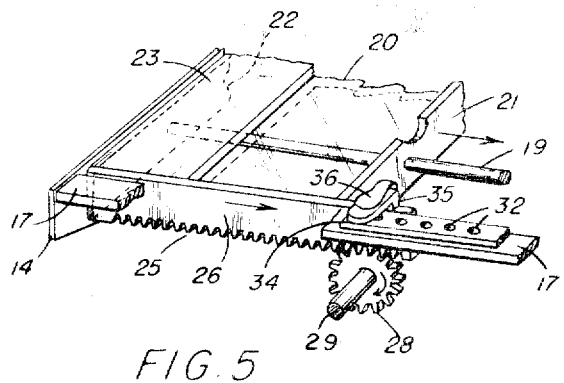
FIG. 5 is a fragmentary detail view showing in perspective the mechanism for moving the film-sheet supporting platen.

To locate the transport in its series of predetermined positions, a series of aligned recesses 32 are formed in the top surface of the lower frame bar 17 to receive an indexing ball (not visible). The ball is located within an aperture in an arm 34 (FIGS. 1, 3 and 5) which overlies the top of the bar 17 and extends from a bracket 35 secured to an extension of the end plate 26 beyond the side plate 21. A leaf-spring 36 is also secured to the bracket and has an end overlying the top of the ball aperture and pressing the ball toward the bar 17 and into the indexing recesses 32.

To assist the attendant in applying the film strip to the film-mount sheet in proper position each time after the platen has been notched over into its next position, a fixed guide bar 37 extends longitudinally over the platen beneath the film-guide channel between the frame bars 16 and 17 to which it is attached at each end.

From the foregoing, it will be observed that the transport for the platen 20 with the film-mount plate thereon can be moved laterally at will by rotation of the thumb nut 31 due to the engagement of the pinion 28 on the shaft 29 engaging the rack 25 on the transport. The transport will be indexed in proper positions by engagement of the indexing ball (within the arm 34) in one or another of the recesses 32.

To feed film in position overlying the film-mount and ready to have the attendant cut off the proper length, a film carrier and dispenser is slidably mounted on the upper inclined portion of the frame.

The carrier comprises a pair of similar long narrow side members 40, 40′ cut from sheets of any suitable material into the form best shown in FIG. 1. Running lengthwise between the side members 40, 40′ for most of their length is a bar or length of sheet material 41 which with the side members 40, 40′ form a guide channel along which film F from a reel is fed. The side members and bottom of the channel may be secured together by bolts or in any suitable fashion.

Figure 6:
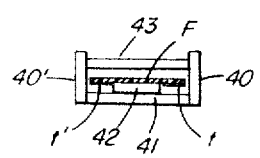
FIG. 6 is a view looking into the end of the film-guide channel.

To keep the edges of the film out of contact with the channel bottom, a bar or strip of material 42 narrower than the distance between the ribbons of adhesive tape *t, t'* (FIG. 6) on the edges of the film is affixed to bottom 41 of the channel on which the film rides as a track with the taped edges of the film extending laterally beyond the track (see FIG. 6). The track runs along the channel the same distance as the bottom 41 of the channel.

To hold the film in the channel, a strip of transparent synthetic plastic material 43 is secured in the channel spaced above the track 42 so as to permit passage of the film between the track and transparent strip. The transparent strip runs less than the full length of the channel to permit a rubber covered pressure roller 44 to press on the film and to press it against a drive wheel 70 hereinafter described.

The pressure wheel is mounted on an axle between the ends of a pair of parallel levers 45, 45' whose other ends are pivotally mounted on a pivot pin 46 extending transversely between a pair of similar arms 47, 47' upwardly extending from the upper edges of the side members 40, 40' midway along their length. A coiled tension spring 48 is anchored at one end to a pin on one of the levers 45 and at its other end to a pin on one of the side member 40 of the channel.

The channel members 40, 40' are supported on a slidable chassis formed of parallel spaced transverse bars 50, 50' connected rigidly together by parallel spaced longitudinally extending stabilizer rods 51, 51'. On the ends of the transverse rods are collars 52, 52' mounted slidably on a pair of parallel spaced guide rods 54, 54' which are fixedly attached and secured to the upper and middle frame bars 15 and 16 respectively. The side members 40, 40' of the film guide channel are mounted on the transverse bars 50, 50' fixedly so that as the chassis 50, 51, 52 slides along guide bars 54, 54', the film guide channel or carrier slides with it as a unit.

To support the reel R of taped microfilm and the protective tapes as they are removed from the film reel, an upstanding post 80 is secured at its lower end to the channel side member 40. Midway up the post mounted in a cylindrical bushing 82' is an axle 82 on which is affixed a large pulley 83. The film reel R is also removably mounted on said axle 82 so as to turn therewith.

At the top of the post 80 in an upper cylindrical bearing 84', an axle 84 is mounted on which is loosely mounted a tape take-off reel having a large-diameter central portion 85 with reduced-diameter hubs (not visible) integral therewith on either side upon which the protective tapes taken off the film will wind up. Large tape-guide discs 86, 86' are mounted on axle 84 adjacent each side of the tape take-off reel to guide the tapes as they wind up on the small hubs of the reel.

To rotate the tape-off reel, a small-diameter pulley 87 is mounted on the axle 84 to turn therewith and is connected by a belt 88 with the larger lower pulley 83. Thus, the axle 84 is rotated at a greater speed than axle 82.

A common spring pressure type friction clutch connection is provided between the axle 84 and reel 85, so that the reel rotates with the axle 84, but may slip thereon when the speed at which the tapes may be taken off the film is less than the speed at which the reel 85 tends to rotate. Thus, the reel 85 always tends to pull the protective tapes off the film somewhat faster than the film moves, to avoid the tapes becoming slack.

Hence, as the film is payed off the reel R, the protective tapes are first peeled off the two edges of the film leaving the adhesive exposed on the film edges. The protective tapes T, T' are then started around the small hubs of the take-off reel and continue to wind themselves thereon as the take-off reel rotates, driven by the belt 88 and pulley 87 from the large pulley 83. The film is payed off the reel R with the adhesive edges facing down as the film passes through the channel. The tapes continue around and are fed up in back of the reels, as viewed in FIG. 1.

In order to cause the film-guide channel to ride upwardly along guide rods 54, 54' and simultaneously to feed film out the lower end of the channel, a rubber covered film drive wheel 70 (FIG. 2) is fixedly mounted between the channel side plates 40, 40' on a shaft 60 which is pivotally supported in those side plates. The drive wheel is positioned so that the periphery will be located so that the film (with protective tapes removed) will pass over the wheel and between it and the pressure wheel 44.

For driving the shaft 60, a large gear 62 is fixedly mounted thereon, outside the film-guide channel, in position to mesh with a small drive gear 63 of a conventional gear reduction mechanism 64 driven by an electric motor (not shown). By conventional wiring, the motor is controlled by a momentary contact push-button electric switch 65 mounted at one end of the lower frame bar 17, so that so long as the switch button is held depressed, the motor will run and the film will be fed through the film-guide channel by film drive wheel 70.

For causing the film carrier to slide up the guide rods 54, 54', a driving disc 66 is permanently mounted on the shaft 60 midway along its length by brazing or welding. Against the disc, a circular pressure pad 67 of phenolic resin or other suitable friction pad material is adapted to be pressed by one end of a spool shaped drum 68 whose opposite end is engageable with a circular friction pad 69 like 67. The spool is loosely mounted on shaft 60.

To press the friction pads and spool together and against the drive disc 66, a hand-operated clamping disc 71 is provided having a central internally screw-threaded bore which threads onto the outer end of shaft 60 that is externally screw-threaded at 60'. A stop 73 limits the counterclockwise or retractive rotation of the clamp disc 71 to maintain it on the shaft.

Thus, when the clamp disc is turned clockwise to move it inwardly along the shaft 60, it presses friction pad 69, spool 68, pad 67 and drive disc 66 firmly against one another, causing the spool to rotate with shaft 60.

Connected at one end of the spool and anchored at its other end to a small lug 73 attached to the top frame bar 15 is a flexible connection such as a length of bead chain 74.

The electric motor, gear reduction 64 are carried by the chassis 50–52 on which they may be mounted in any suitable fashion. Thus, the source of power, the driving mechanism, the film-guide channel and reels supported thereby all move together as a unit which has previously been referred to as the film-carrier and dispenser, but more simply is hereinafter referred to as the film carrier.

The diameters of the drive wheel 70 and of the portion of the spool 68 on which the chain winds are the same, it being the intent that the upward movement of the film carrier shall be at the same speed as the feeding of the film out of the film-guide channel.

In operation, assuming that the film carrier is at its lowermost position on the guide rods 54, 54' and along the inclined deck of the frame, the attendant will peel off the protective strips T, T' (FIG. 1) from the adhesive tapes *t, t'* (FIG. 6) that adhere to the edges of the film. The ends of these protective strips are wound around the small hub portions of the reel 85. The film is then threaded through the film-guide channel until a tab end extends roughly about one inch (more or less as desired) from the end of the channel. In this position, the film is directly over the right side of the film-mount sheet at it rests on platen 20. If the clamp disc 71 has not already been rotated clockwise, it will now be, so as to frictionally engage the spool 68, the pressure pads 67, 69 and the drive disc 66.

The attendant may now press the end of the film down on the film-mount sheet and press the switch button 65 to start the motor.

The starting of the motor causes the small gear 63 to drive the main gear 62, rotating shaft 60 and film drive wheel 70. This causes the film to move relatively to the film-guide channel while, simultaneously, the rotation of the shaft and spool 68 cause the chain 74 to wind up on the spool pulling the film carrier up the guide rods until the button of the control switch 65 is released.

If desired, a limit switch in series circuit with manual control switch 65 may be mounted on the deck of the frame in position to be engaged by the film carrier as it reaches its uppermost position.

While the carrier is in its elevated position, the attendant will cut off with scissors the end of the film, pressing it onto the film-mount plate, and leaving a tab end of the film extending from the film-guide channel, as before.

The parts will remain in the position where stopped until the hand-operated disc 71 is rotated counterclockwise to release the frictional grip of the drive disc 66 on the spool 68. Thereupon, the carrier can descend to its lowermost position in readiness to repeat the cycle.

The attendant will now operate the thumb wheel 31 to move the platen 20 to the right one notch in the indexing recesses 32, thus locating the platen in position for application of the next strip of film. The process may be repeated until the film-mount sheet is filled or until all strips of film relating to a subject have been adhered to the film-mount sheet.

If the last strip contains less pictures than would fill a strip the full length of the film-mount sheet, the film may be cut accordingly when the film carrier is only partway up the inclination of the frame deck; and the film carrier may be let down to starting position by manually loosening the clamp disc 71.

Many modifications within the scope of the invention will occur to those skilled in the art. Therefore, the invention is not limited to the specific embodiment illustrated and described.

Reference is made to our copending application Ser. No. 638,995, filed May 16, 1967 entitled Apparatus for Making Microfiche, disclosing another form of our invention and claiming the same generically.

What is claimed is:

1. A machine for measuring out and applying to transparent sheets strips of microfilm having double-coated narrow strips of pressure sensitive adhesive tape adhering to and extending only along the edges of said microfilm and protective strips on said narrow strips, comprising a support on the machine, a film reel on said support, a take-off reel on the machine to receive and wind up such protective strips leaving said narrow strips exposed, means connecting said take-off reel to said film reel and causing rotation of said take-off reel as said film reel rotates, means on said machine to support a transparent sheet, movable means on said machine to guide film from said film reel across a transparent sheet on said supporting means in position to be applied to a supported sheet, and means to move film along said guide means.

2. A machine as claimed in claim 1 having power-driven means to feed the film through said guide means, and control means to start and stop said power means.

3. A machine as claimed in claim 1 having means slidably supporting said sheet-supporting means, and means to position said sheet-supporting means at different points along its supporting means.

4. A machine as claimed in claim 3 having power-driven means to feed the film through said guide means, and control means to start and stop said power means.

5. A machine as claimed in claim 1 having means slidably supporting said film-guide means, and power-driven means to move said film guide along its supporting means.

6. A machine as claimed in claim 1 having means slidably supporting said film-guide means, power-driven means to move said film guide means along its supporting means and simultaneously to feed the film through said film-guide means, and control means to start and stop said power means.

7. A machine as claimed in claim 6 in which the power driven means includes means causing movement of said film guide in one direction and feeding the film in the other direction at the same speed.

8. A machine for applying to transparent sheets a film having strips of adhesive along the edges of the same surface thereof comprising a sheet support, means to guide the film over said sheet support in position to be applied to a sheet supported thereon, and means in said guide means to support the film during passage through said guide means to maintain the adhesive strips out of contact with said guide means.

9. A machine as claimed in claim 8 having power-driven means to feed the film through said guide means, and control means to start and stop said power means.

10. A machine as claimed in claim 8 having means slidably supporting said film-guide means, power-driven means to move said film guide along its supporting means, and means driven by said power means to simultaneously feed the film through said film-guide means, and control means to start and stop said power means.

11. A machine as claimed in claim 8 in which said power-driven means includes a wheel engaging the film on one side to feed the film through said guide means, a pressure wheel engaging the film on the other side and pressing it against the feed wheel, and means to start and stop said feed wheel.

12. A machine for applying to transparent sheets a film having strips of adhesive along the edges of the same surface thereof comprising a sheet support, means to guide the film over said sheet support in position to be applied to a sheet supported thereon, means slidably supporting said film-guide means, power-driven means to move said film guide along its supporting means, and means driven by said power means to simultaneously feed the film through said film-guide means, and control means to start and stop said power means.

13. A machine for applying to transparent sheets a film having strips of adhesive along the edges of the same surface thereof comprising a sheet support, means to guide the film over said sheet support in position to be applied to a sheet supported thereon, means slidably supporting said film-guide means, and power-driven means to move said film guide along its supporting means, said power-driven means comprising a power source, and driving means, and a releasable connection between said source and said film-guide means enabling said film-guide means to be moved along its support independently of said power source when said connection is released.

14. A machine as claimed in claim 13 wherein said releasable connection is a manually releasable friction clutch.

References Cited

UNITED STATES PATENTS

| | | | |
|---|---|---|---|
| 2,078,448 | 4/1937 | Jost | 156—542 |
| 2,282,245 | 5/1942 | Ratley | 242—55.3 |
| 2,325,400 | 7/1943 | Hoover | 242—67.3 X |
| 2,382,406 | 8/1945 | Engberg | 226—96 X |
| 2,672,251 | 3/1954 | Schwartz et al. | 156—517 X |
| 2,676,765 | 4/1954 | Kaplan | 242—68.5 |
| 2,718,975 | 9/1955 | Bower | 156—561 X |
| 2,833,489 | 5/1958 | Hall | 242—76 X |
| 3,106,324 | 10/1963 | Fritzinger | 242—55.53 X |
| 3,181,988 | 5/1965 | Engert | 156—517 X |

FRANK J. COHEN, *Primary Examiner.*

W. S. BURDEN, *Assistant Examiner.*